Aug. 18, 1959  M. S. DE LAY  2,900,194
LOAD EQUALIZER FOR TRAILER

Filed March 8, 1957  3 Sheets-Sheet 1

INVENTOR.
MANFORD SAMUEL DE LAY
BY Frank C. Analey
agent

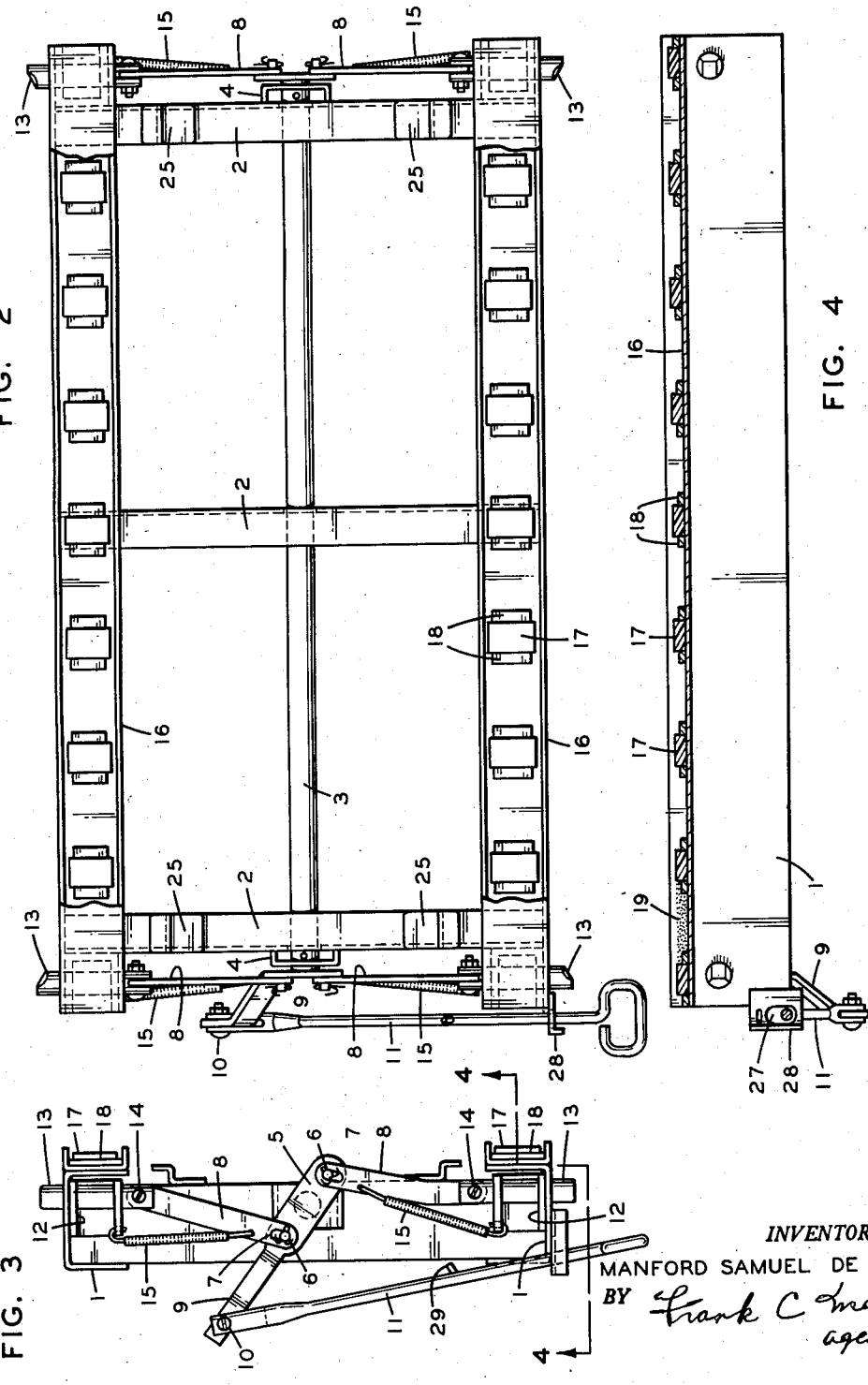

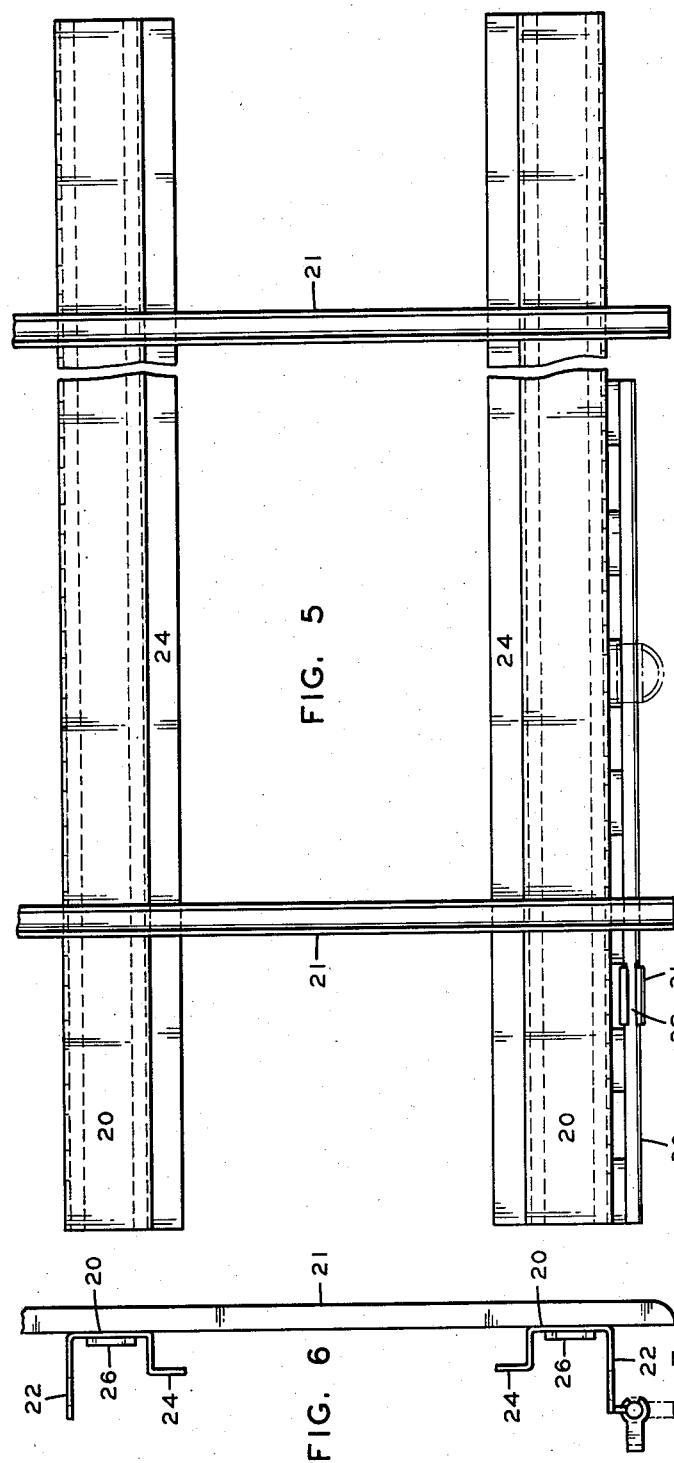

2,900,194
Patented Aug. 18, 1959

2,900,194

LOAD EQUALIZER FOR TRAILER

Manford Samuel De Lay, St. Louis, Mo.

Application March 8, 1957, Serial No. 644,836

4 Claims. (Cl. 280—34)

This invention pertains to trailer trucks, and more particularly to the type that has provisions for adjusting the relation of the rear wheels to the body for the purpose of balancing the load.

In most trucks of the type described above, there are cylinders, pipes and other hydraulic appliances mounted within the wheel truck. It is an object of this invention to provide a wheel truck which is clear of internal obstructions.

Another object is to provide improved means for connecting the wheel truck to the trailer body, such connection including improved bearings to facilitate relative movement of the wheel truck and trailer body incident to balancing the load on the wheels.

Another important object is realized by the particular arrangement of the bearing elements on the slidably related channel rails of the body frame and wheel truck frame which is adapted to seal out water and road dirt.

Still another object is realized by the provision of improved guide means between the wheel truck and trailer body to permit slidable adjustment and yet assure positive connection that precludes separation.

Generally stated, the invention comprises a wheel truck having suitably braced side stringers composed of channel beams with their open sides located inwardly. Another channel member is secured to each of the side channel beams and is located with its open side upward to receive bearing elements. A body frame secured to the trailer includes side channel rails inverted over each of the upwardly disposed channel members, and includes bearing elements in such inverted channel rails adapted to engage slidably the bearing elements mounted in the upwardly disposed channel members. The inverted channel rails include inner flanges bent inwardly to engage keeper members attached to the wheel truck frame to preclude separation of the wheel truck from the trailer body and yet permit relative slidable movement.

A preferred embodiment of this invention is illustrated in the accompanying drawings, in which:

Fig. 2 is a top plan view of the wheel truck;

Fig. 3 is an end elevational view as seen from the left of Fig. 2;

Fig. 4 is a sectional view as seen along line 4—4 of Fig. 3.

Fig. 5 is a top plan view of the body frame attached to the trailer body;

Fig. 6 is an end elevational view as seen from the left of Fig. 5, and

Fig. 7 is a side elevational view of the body frame shown in Fig. 5

Figure 1:
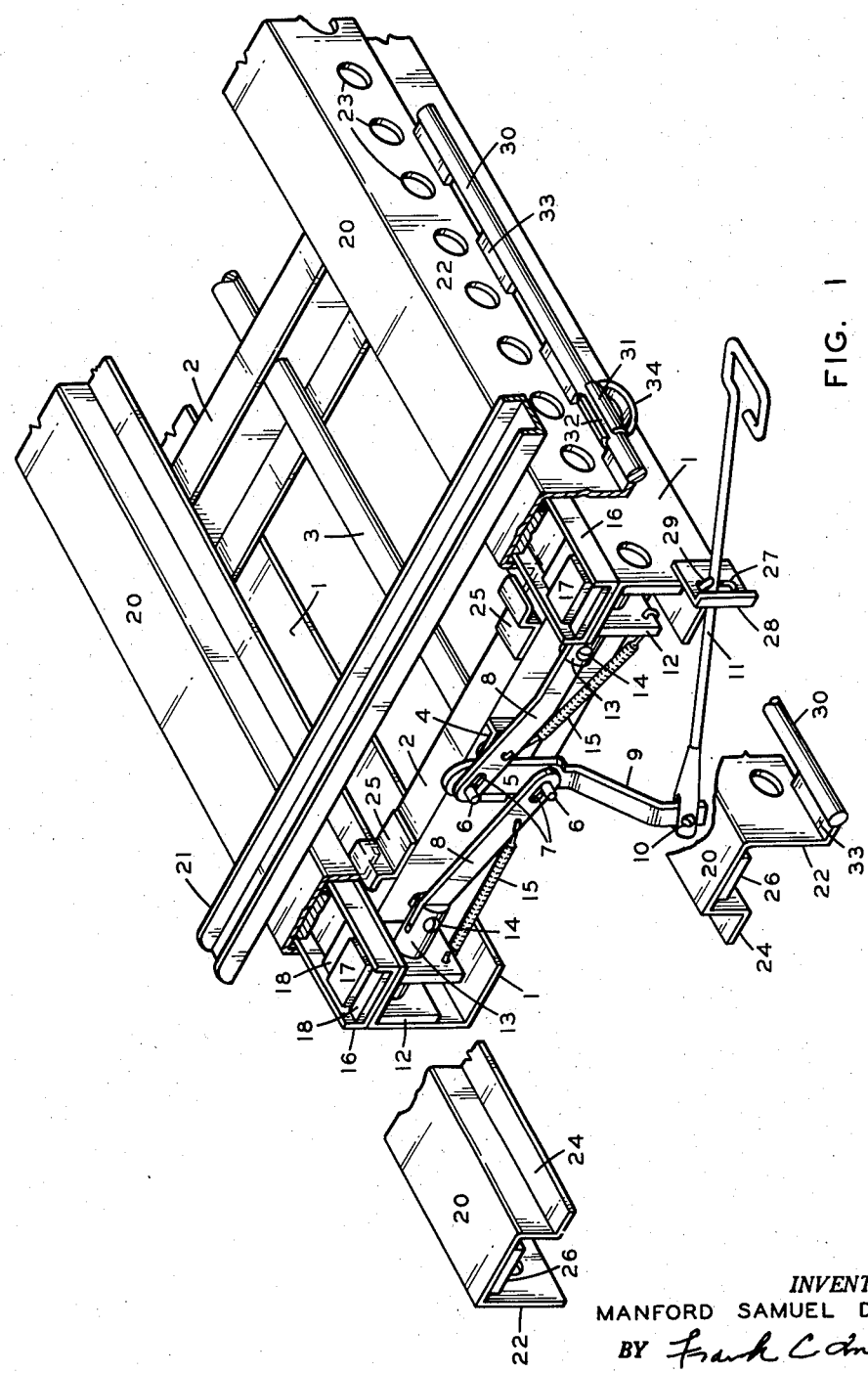
Fig. 1 is a perspective view of part of the wheel truck embodying this invention, with the trailer body rails mounted thereon, and showing various parts broken away.

Referring to the drawings, the wheel truck consists of a pair of side channel beams 1 framed together by cross braces 2 usually of channel form. The frame, consisting of members 1 and 2, is mounted on road wheels in any suitable manner. However, such wheels are not shown in order to more clearly illustrate the wheel truck frame structure. The channel beams 1 are disposed so that the open sides face inwardly.

The wheel truck frame has mounted on one of the cross channels 2 at each end a locking mechanism as illustrated in Fig. 2. As these mechanisms are identical at the two ends of the frame, only one of them need be described. This locking mechanism is described in detail in copending application Serial No. 607,014, filed August 30, 1956 by this applicant.

The locking mechanism includes a shaft 3 extending longitudinally of the wheel truck frame and journalled at its ends in the channels 2 and in brackets 4 mounted one on each of the cross channels 2. Secured to the end of shaft 3 is a crank member 5 that carries two crank pins 6 equally spaced on opposite sides of the axis of shaft 3. A link 8 is connected to the pins 6, the pins 6 being received in slots 7. The crank member 5 includes an integral downward extension 9 pivotally connected at 10 to an operating handle 11. Accordingly, by moving the handle 11 to the right or left in Fig. 1, the crank member 5 may be rocked back and forth. This movement rocks the shaft 3 which imposes a similar movement on an identical crank member attached to the other end of the shaft.

Mounted at each end of channel member 2 is a U-shaped bracket 12, the legs of which are perforated to receive a slidable locking pin 13. The web of channel beam 1 opposite bracket 12 is also perforated in alignment with pin 13 so as to permit the pin to pass there-through. The inner end of each pin 13 is pivotally connected by a pivot bolt 14 to the end of one of the links 8. Tension springs 15 are attached to links 8 and to the inner leg of U-shaped bracket 12. These springs 15 acting through links 8 tend to urge the pins 13 outwardly in a locking direction as will be later described in detail.

Secured by welding or otherwise to the top of each channel beam 1 is a second channel member 16 arranged with its open side upwardly. A plurality of pads 17, preferably formed of a phenolic material, are arranged and fixed in longitudinally spaced relation along each channel member 16. Each pad 17 is held by a pair of lateral cross bars 18. The pads 17 afford smooth, hard, abrasion-resistant top surfaces that constitute bearings. Disposed in the spaces or pockets between the pads 17 is a lubricant 19 extending to the top level of the bearing surfaces of pads 17, as shown in Fig. 4.

The trailer body may have any suitable frame including a pair of channel-shaped side rails 20 disposed in an inverted position over channels 16 of the wheel truck frame. These rails 20 are framed together by cross floor sills constituted by channels 21. The outer flange 22 of each rail 20 is provided with a series of perforations 23 uniformly spaced longitudinally of the rail. These perforations 23 serve as sockets into which the pins 13 enter in order to lock the wheel truck frame to the rails 20. The slots 7 in the locking mechanism provide lost motion between the links 8 and the pins 6 so that in case all of the pins 13 do not come into alignment with their sockets simultaneously, each one may enter its own socket individually when that socket does come into alignment.

The inner flanges 24 of each rail 20 is bent inwardly at a point just below the bottom of channel 16 to provide a ledge adapted to fit under keepers 25 mounted on the end channel braces 2. The keepers 25 cooperate with in-turned flanges 24 to permit longitudinal slidable adjustment of the wheel truck frame relative to the side rails 20 of the trailer body, and preclude separation of such frame members.

A bearing element 26 is mounted and fixed internally of each inverted rail 20. The bearing element 26 extends the length of rail 20 and is supported on bearing pads 17 of the underlying channel 16. The pads 17 and bearing elements 26 provide the bearing surfaces between the wheel truck and the trailer body during adjustment of the position of the wheel truck relative to the trailer body in equalizing the load. It will be apparent that the pads 17 in cooperation with channel members 16 provide a plurality of lubricant pockets and serve to hold an adequate quantity of lubricant for smooth slidable adjustment of the wheel truck.

The handle 11 by which the crank member 5 is operated to retract pins 13 from their sockets, is arranged to pass through a slot 27 in a guide plate 28 mounted on one of the channel beams 1. The handle 11 is provided with a lug 29 adapted to lodge against the plate 28 when handle 11 is raised in slot 27 so that the lug 29 will retain the pins 13 in a retracted position as shown in Fig. 1. When in this position, the trailer body may move relative to the wheel truck frame.

A mechanism is provided which will release the pins 13 automatically when the desired adjustment has been obtained. This mechanism includes a rod 30 attached to the lower edge of outer flange 22 of one side rail 20. Slidably carried on rod 30 is a sleeve 31 having a longitudinal slot 32 and a cam 34. The sleeve 31 and integral cam 34 may be selectively moved along rod 30 by rotating sleeve 31 so that web portions 33 pass through slot 32, and set at any one of a number of different points as determined by the spaces provided between web portions 33.

As may be seen from Fig. 1 with the cam 34 set in the position shown, if the trailer is pulled forward so as to move the rails 20 forwardly with respect to the wheel truck, the cam 34 will move therewith. When the desired position of adjustment is reached, the cam 34 will engage the handle 11 and force the handle downward to disengage lug 29 from plate 28. This action frees the locking mechanism so that the springs 15 act to move the pins 13 outwardly in order to enter sockets 23.

Accordingly, the operator may move the wheel truck frame to any new position of adjustment by first properly setting the cam 34 along rail 20 and then retracting the pins 13 by pulling the handle 11 outwardly to engage the lug 29 with plate 28. The trailer body may now be moved in the appropriate direction and when the point is reached where cam 34 engages handle 11, the handle will be tripped and the pins 13 released to lock the wheel truck in its adjusted position.

Various changes may be made in the details of construction, within the scope of the appended claims, without departing from the spirit of this invention. Parts of the invention may be used without the whole and improvements may be added while retaining some or all of the advantages of the invention.

I claim:

1. In a trailer of the character described, a body frame having inverted channel rails, a bearing element longitudinally disposed and mounted in each rail, a wheel truck frame having side stringers including channel members arranged with their open sides faced upward, said channel members being slidably received in said rails, a plurality of bearing elements longitudinally spaced along each channel member to provide a plurality of lubricant pockets, and lubricant in the pockets substantially to the level of said bearing elements in said channel member, the last said bearing elements engaging the first said bearing elements and supporting said rails so as to seal out water and dirt.

2. In a trailer of the character described, a wheel truck frame including side channel beams arranged with their open sides faced inward, means bracing said side channel beams, channel members secured to the said channel beams and arranged with their open sides faced upward, a body frame having side channel rails inverted over said channel members, a bearing element longitudinally disposed and mounted in each rail, a plurality of bearing elements longitudinally spaced along each channel member to provide a plurality of lubricant pockets, lubricant in the pockets substantially to the level of the said plurality of bearing elements, the last said bearing elements engaging the said bearing elements in said rails and supporting said rails so as to seal out water and dirt.

3. In a trailer of the character described, a wheel truck frame having side channel beams arranged with their open sides faced inward, means bracing said channel beams, channel members secured to the said channel beams and arranged with their open sides faced upward, keeper elements at each side of said wheel truck frame to provide ledge-receiving grooves above said bracing means, a body frame having side channel rails inverted over said channel members, bearing means spaced longitudinally along said channel members to provide lubricant pockets, lubricant in said pockets up to the level of said bearing means, and bearing elements on said rails and bridging said bearing means when supported thereon, the said rails having inner flanges bent inwardly to provide inturned ledges located above the bracing means, said ledges being disposed in the ledge-receiving grooves of said keepers to permit slidable adjustment and preclude separation of said frames.

4. In a trailer of the character described, a wheel truck frame having side channel beams arranged with their open sides faced inward, means bracing said side channel beams, channel members secured to the said channel beams and arranged with their open sides faced upward, bearing elements spaced longitudinally in said channel members to provide lubricant pockets, lubricant in said pockets up to the level of said bearing elements, keepers at each side of said wheel truck frame providing ledge-receiving grooves, locking mechanism on the wheel truck frame including locking pins, each side channel beam having its web provided with a hole through which one said pin extends, a body frame having side channel rails inverted over said channel members, bearing elements in said rails bridging and engaging the bearing elements in said channel members, the said rails having outer flanges overlapping the web of said side channel beams, and provided with a plurality of apertures adapted selectively to receive and engage said pins for fixing the relative position of said frames, and including inner flanges having portions disposed in the ledge-receiving grooves of said keepers to permit slidable adjustment and preclude separation of said frames.

References Cited in the file of this patent

UNITED STATES PATENTS

| | | |
|---|---|---|
| 1,201,790 | Allen | Oct. 17, 1916 |
| 1,621,555 | Miller | Mar. 22, 1927 |
| 2,000,463 | Browne | May 7, 1935 |
| 2,589,678 | De Lay | Mar. 18, 1952 |
| 2,606,769 | De Lay | Aug. 12, 1952 |
| 2,675,276 | Daugherty | Apr. 13, 1954 |
| 2,733,972 | Diack | Feb. 7, 1956 |
| 2,831,700 | Sheppard | Apr. 22, 1958 |
| 2,835,504 | Acker | May 20, 1958 |